DATA TRANSFER CONTROL

Filed Dec. 15, 1961 3 Sheets-Sheet 1

INVENTORS
KENNETH W. BORROR
ROBERT M. MEADE

BY Gunter A. Hauptman
ATTORNEY

Jan. 4, 1966 K. W. BORROR ETAL 3,228,008

DATA TRANSFER CONTROL

Filed Dec. 15, 1961

3 Sheets-Sheet 2

Jan. 4, 1966 K. W. BORROR ETAL 3,228,008

DATA TRANSFER CONTROL

Filed Dec. 15, 1961 3 Sheets-Sheet 3

United States Patent Office 3,228,008
Patented Jan. 4, 1966

3,228,008

DATA TRANSFER CONTROL

Kenneth W. Borror, Poughkeepsie, and Robert M. Meade, Wassaic, N.Y., assignors to International Business Machines Corporation, New York, N.Y., a corporation of New York Filed Dec. 15, 1961, Ser. No. 159,516
12 Claims. (Cl. 340—172.5)

This invention relates to electronic apparatus. More particularly this invention relates to apparatus which permits a source to feed units through a processor to a sink at an optimum rate.

Whenever a number of operations are performed upon each of a number of units in a stream, timing is important. Units fed along a production line will pile up at the first operating position if they arrive more quickly than the man at that position can work on them. As a result, the source will eventually become idle. On the other hand, if the units are fed too slowly, the worker will be idle part of the time. In either case the system is inefficient because one or more elements may be idle. The optimum situation is when the source feeds units to the first position at a rate calculated to give the worker at the first position a new unit at exactly the time that he is finished with the previous unit. This problem may be complicated by two additional factors. First, the man at the first location on the production line may experience a delay between the time that he requests the source to feed a unit to him and the time that the unit actually reaches him. Thus, in the case where the operations performed differ for each unit, the worker must be able to remember several operating instructions until such time that the related unit comes along. Second, the worker at the next position of the production line may be working too slowly, causing units to back up to the first worker's position.

A problem analogous to the production line problem occurs in cyclically operable electronic data processing systems. A source feeds data representative operands through a data processor to a data utilizing sink. The source of operands may, for example, be a core storage memory having addressable locations. A request for an operand located at a specified address is honored after an inherent accessing delay. Thus, when requested operands are accessed they must be related to the proper operations performed in the data processor. Operands must be accessed at a rate which prevents the source, the storage and the processor from being idle for long intervals. The processor performs a number ($n$) of operations upon each accessed operand. For example, assume that each operand comprises 64 bits and that the processor takes eight ($n=8$) operating cycles to cut the operand into a series of eight eight-bit bytes. In this simplified example, if the source supplies operands more than once every eight operating cycles, the handling of operands by the processor will be interfered with and the operands will, in prior art devices, back up and interfere with the operation of this source. If the source takes more than eight cycles to supply an operand, the processor will be idle part of the time. If the sink to which the bytes are directed is not ready to receive a byte each time one is generated, the processor will in prior art devices, be idle part of the time.

It is, therefore, an object to provide apparatus which operates to optimumly time requests for operands from operand sources which honor requests after inherent delays.

It is another object to provide apparatus which operates to optimumly time requests for the feeding of operands from a source to a sink through a processor which performs a number of operations upon each operand.

Still another object is to provide apparatus which operates to optimumly time requests for the supply of operands from a source through a processor to a sink which can receive processed operands at unpredictable times only.

A further object is to provide apparatus which operates to prevent delays between the time of request for data access to a storage location, and the actual time of access, from causing separation of request information from the related accessed data.

It is still another object to provide apparatus which operates to prevent loss of data due to unreadiness of the sink to receive processed data when it is available from the processor.

These objects are achieved by the apparatus of this invention in a novel manner utilizing means for recognizing the number of operations to be performed upon the currently requested operand (before the request is honored) and for relating this information to the activity of the sink. Every time that the sink is ready to receive data processed as a result of a previously honored accessing request, this recognized number is reduced by one. When the number of processed operands which the sink is ready to receive equals the number of operations to be performed upon the currently requested operand, the register will contain zero. At this time, a new operand will be requested. In this way new units are placed on the production line conveyor belt at a rate determined by the number of operations to be performed by the first operator on the preceding unit and by the readiness of the operator at the next position.

In the event that the delay between a request and the availability of the requested operand is long, a number of requests may be made before the first operand requested is accessed. A first-in first-out register block stores the parameters (including the number of operations $n$) associated with each requested operand. As the operands emerge from the storage the related parameters are automatically associated with them. The parameter $n$ utilized for controlling transfers (as opposed to operations) is removed from the first register.

If the sink operates discontinuously, processed operands are routed to another first-in first-out register block for temporary storage during periods when the sink is not ready. When the sink then becomes ready it will first empty out the register block before receiving processed data from the processor, preserving the order in which data emerged from the processor.

The foregoing and other objects, features and advantages of the invention will be apparent from the following more particular description of the preferred embodiment of the invention, as illustrated in the accompanying drawings.

In the drawings:

FIGURE 1 is an overall block diagram of apparatus incorporating the invention.

FIGURES 2*a* and 2*b* together form a logic level diagram of apparatus embodying the invention.

FIGURE 3*a* is a diagram of the format of an illustrative data definition word.

FIGURE 3*b* is a diagram of the format of an illustrative data word.

FIGURE 3*c* is a wave form diagram of pulses occurring in the system during an illustrative operation.

GENERAL DESCRIPTION

Referring first to FIGURE 1, the cyclically operable apparatus embodying this invention comprises: an operand source 1, an operand processor and processing control 2, a result utilizer sink 3, an operand selector 4, a data definition source 5, and a data definition control 6. Data words (or operands), for example of the type shown in FIGURE 3*b*, are supplied by the operand source 1 to the operand processor and processing control 2. The operand processor and processing control 2 operates upon supplied data words, generating results which are transferred to the result sink 3 whenever it is ready to receive results. For example, as shown in FIGURE 3*b*, the operand processor may cut the data words supplied by the operand source 1 into sections (or bytes) such as A, B, C, etc., to be sent in a stream serially by byte to the result sink 3. Thus, for each data word supplied to the operand processor and processing control 2, a number of operations are performed. Results emerge from the operand processor and processing control 2 more often than data words enter it.

Still referring to FIGURE 1, data words are selected from the operand source 1 by means of the operand selector 4. The operand source 1 is a device which stores data words at accessible locations, the operand selector 4 supplying the information necessary to define a location wherein a desired data word is stored. There is an inherent delay between the time that the operand selector 4 receives a request for access and the time that the requested information becomes available from the operand source 1. This delay is different for different apparatus.

The data definition source 5 supplies a new data definition word, for example of the type shown in FIGURE 3*a*, every time that it receives an input on the line labeled Transmit. A portion (SWA) of the data definition word, sent to the operand selector 4, identifies a particular data word stored in the operand source 1. The balance of the data definition word (SBA, M, N, I) defines processing parameters, which are sent to the operand processor and processing control 2 when they are held for use in controlling processing limits. The format shown in FIGURE 3*a* illustrates, but is not limited to, a data definition word which permits the operand processor and processing control 2 to perform indexing operations upon supplied data words of the type shown in FIGURE 3*b*. Other operations could be specified by providing an additional word portion. The SWA portion of the data definition word indicates the location in the operand source 1 at which a data word begins. The SBA portion of the data definition word initially indicates a first section or byte, to be removed from the data word by the operand processor and processing control 2 and sent to the result sink 3. The I portion is added to the SBA portion once during each of a number of incrementing cycles so that successive bytes (the first bits of each being separated by I bits) are selected for transmission in a stream to the result sink 3. The N portion indicates the number of incrementing cycles to be taken, while the M portion represents the number of incrementing cycles completed. The M portion is increased once for each addition of the SBA and I portions and the M portion and N portion are compared. The equality of the M portion and N portion will be sensed to halt indexing at the Nth cycle. Therefore, if the SBA portion of the data definition word in FIGURE 3*a*, is zero, the I portion is 8, and the N portion is 8, then the data word at the SWA location (100), shown in FIGURE 3*b*, will be divided into eight eight-bit bytes by the operand processor and processing control 2. An eight-bit byte is always selected even though the I portion is more or less than eight. In effect, bytes containing from one to eight bits can be selected. This operation is explained in detail in the Herwitz et al. application referred to below in the detailed description of the operand processor and processing control 2.

The data definition control 6 determines when a new data definition word is to be generated by the data definition source 5, on the basis of information received from the operand processor and processing control 2 on the line labeled Parameter (N) and from the result sink 3 on the line labeled Sink Ready. The data definition control 6 utilizes the N portion of the last data definition word sent to the operand processor and processing control 2 to determine the spacing between data definition words. Since the SWA portion of a data definition word specifies a data word, the data definition control 6 in effect determines the spacing between data words. Thus, if the N portion of the currently transmitted data definition word indicates that the operand processor and processing control 2 is to perform eight operations upon a data word, the next following data word should be spaced no closer than eight operation cycles behind the data word associated with the N portion of the current data definition word. Since it is possible that the result sink 3 will not be ready to receive results from the operand processor and processing control 2, it may be necessary to space data words in time even more widely apart than would be indicated by the N portion of the current data definition word. Therefore, the data definition control 6 utilizes information from the result sink 3, on the line Sink Ready, to time the transmission of data definition words and, as a result, data words. A signal on the line Transmit occurs only when the result sink 3 has indicated on the line Sink Ready, its readiness to receive results a number of times equal to the N portion of the most recently transmitted data definition word. For example, assume that the current N portion is eight and that the result sink 3 is ready each time that a result emerges from the operand processor and processing control 2. Then, a request for a new data word will be sent to the operand source 1 after eight cycles of operation. Assuming, however, that the result sink 3 failed to be ready two times when a result was available from the operand processor and processing control 2, then the next data word will be requested after ten cycles of operation because eight Sink Ready indications did not occur until after ten operation cycles. Thus, the lack of readiness of the result sink 3 affects the rate at which the operand source 1 supplies data words.

GENERAL OPERATION

Referring to FIGURES 1, 3*a* and 3*b*, an illustrative operation of the invention will now be described. Assume that the data definition word shown in FIGURE 3*a* has been sent to the operand selector 4 and to the operand processor and processing control 2 by the data definition source 5. The operand selector 4 will initially request the data word, shown in FIGURE 3b, specified by the SWA portion (100), of the data definition word. The processing parameters SBA (00), M (0), N (8) and I (8) were initially sent to the operand processor and processing control 2 at the same time that the SWA portion was sent to the operand selector 4. The N portion (8) of the data definition word is sent to the data definition control 6 as soon as the data definition word arrives from the data definition source 5. The N portion stored in the data definition control is, for convenience, referred to as NS in this general example only. After a time delay inherent in the operand source 1, the data word specified by the SWA portion will be sent to the operand processor and processing control 2.

It is emphasized that this example illustrates only a special case. The most recent data definition word N-portion is always sent to the data definition control 6. But the data definition word actually used to control the operand processor and processing control 2 may be different. There may be several data definition words not yet used because the related data words have not been received by the operand source. This data word operation is controlled by the oldest data definition word, whereas the spacing is controlled by the most recent.

During the first cycle following the arrival of a data word from the operand source 1, the first byte (A) specified by the initial SBA portion (00) of the data definition word will be available to the result sink 3, if all bytes from previous operations have been accepted by the sink 3. Since the result sink 3 is ready to receive a result, the first byte (A) is taken by the result sink 3 and the data definition control 6 records the first Sink Ready indication by decrementing the stored N portion (to $NS=7$). Preceding the first cycle, and before data arrived, the stored N portion may have been decremented if the sink was ready. The I portion of the data definition word is added to the SBA portion, forming a new SBA portion (08) and the M pulse is incremented by one, giving a new current M portion (1).

During the second cycle the next byte (B) defined by the current SBA portion (08) of the data definition word, is made available to the result sink 3, which is again ready to receive a result, a fact recorded by the data definition control 6 (so that $NS=6$). The SBA portion is again incremented to (16) by the I portion and the M portion is incremented to (2) by one.

During the third cycle of operation the next data word byte (C) beginning with the address (16) indicated by the current SBA portion of the data definition word is made available to the result sink 3. At this time the result sink 3 is not ready to receive this byte (C) so that the byte must be held. The data definition word SBA portion is updated ($SBA=24$) and the M portion is incremented ($M=3$). Note that the data definition control 6 does not change the N portion ($NS=6$).

During the fourth cycle of operation, the next byte (D) beginning with a bit identified by the current SBA portion (24) is available. It is assumed that the result sink 3 still is not ready and that this byte (D) is held. The SBA portion is again updated ($SBA=32$) and the M portion is incremented ($M=4$). The N portion ($NS=6$) in the data definition control 6 is unchanged.

During the fifth cycle of the operation the next byte (E) is available. The result sink 3 is now ready to receive bytes from the operand processor and processing control 2. It receives the first byte that was available (C), the current byte (E) being held. The data definition control 6 records ($NS=5$), the third indication of Sink Ready. The SBA portion of the data definition word is updated ($SBA=40$), and the M portion is incremented ($M=5$).

During the sixth cycle of operation the next byte (F) is made available. Result sink 3 is ready to receive bytes, receiving the first byte available but not yet used (D), the current byte (F) being held. The data definition control 6 records the occurrence of the fourth Sink Ready indication ($NS=4$). The SBA portion is updated $$(SBA=48)$$

and the M portion is incremented ($M=6$).

During the seventh cycle of operation the next byte (G) is made available, the result sink 3 receiving the next available unused byte (E). The fifth Sink Ready indication is record by the data definition control ($NS=3$) 6. The SBA portion is updated ($SBA=56$) and the M portion is incremented ($M=7$).

During the eighth cycle of operation the next and last byte (H) is made available. The result sink 3, receives the first unused available byte (F). The sixth Sink Ready indication is recorded by the data definition control ($NS=2$) 6. The M portion is incremented ($M=8$). Since the M part and the N part of the data definition word are equal, the operation of the operand processor and processing control 2 is complete.

During the ninth cycle of operation no new byte is made available to the result sink 3, by the operand processor and processing control 2. However, the first available unused byte (G) is received by the result sink 3 and the seventh Sink Ready indication is recorded by the data definition control ($NS=1$) 6.

During the tenth and final cycle of operation the result sink 3 receives the next and last available byte (H) from the operand processor and processing control 2, and the eighth Sink Ready occurrence is recorded by the data definition control ($NS=0$) 6. At this time, the number of Sink Ready indications that have occurred equals the current processing paramter N portion (8), resulting in the occurrence of a signal on the line Transmit. As a result, the data definition source 5 causes the operand selector 4 to select a new data word which selection follows the previous data word by ten cycles of operation. In the special case illustrated here, no additional bytes are made available to the result sink 3. In general, however, during the time (8th cycle) that the last byte is made available a new data word will be received, the first byte of which will be made available during the next (9th) cycle.

DETAILED DESCRIPTION

Figure 1:
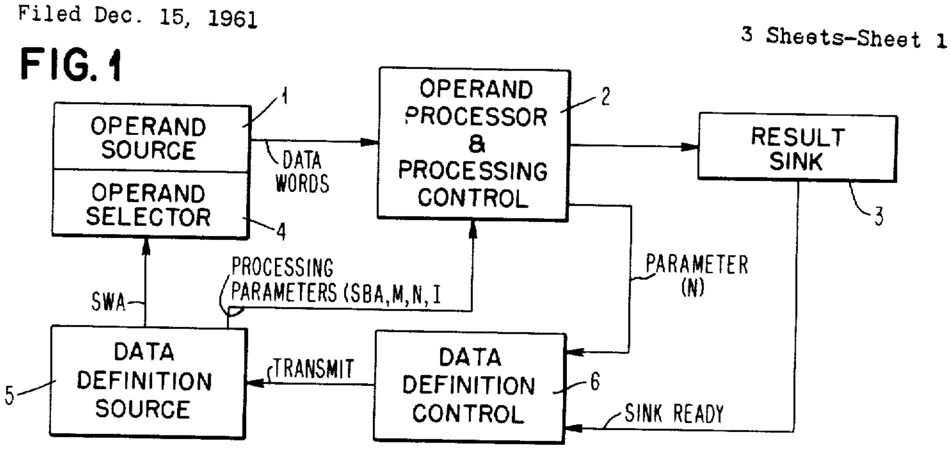
Figure 2A:
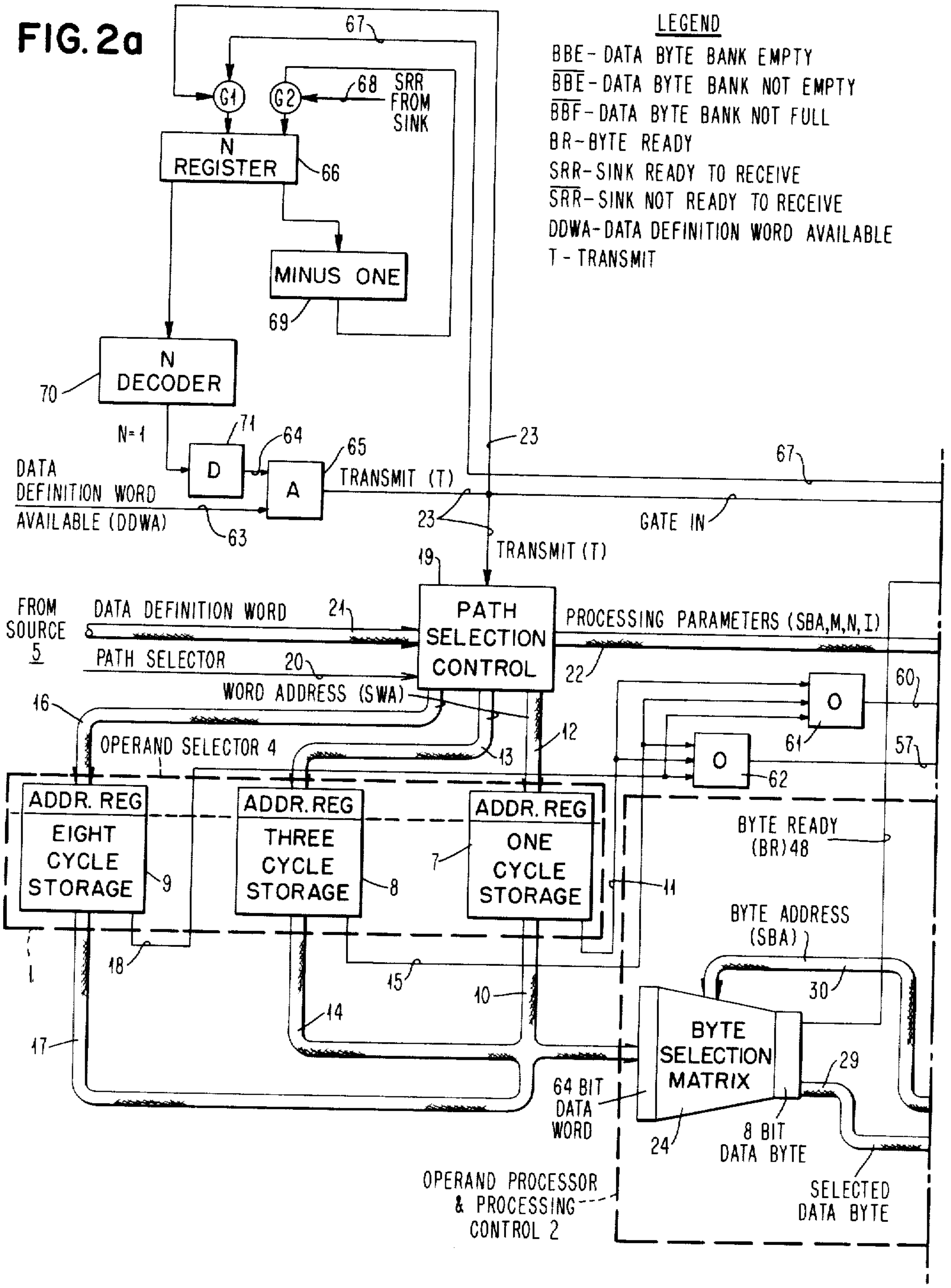
Figure 2B:
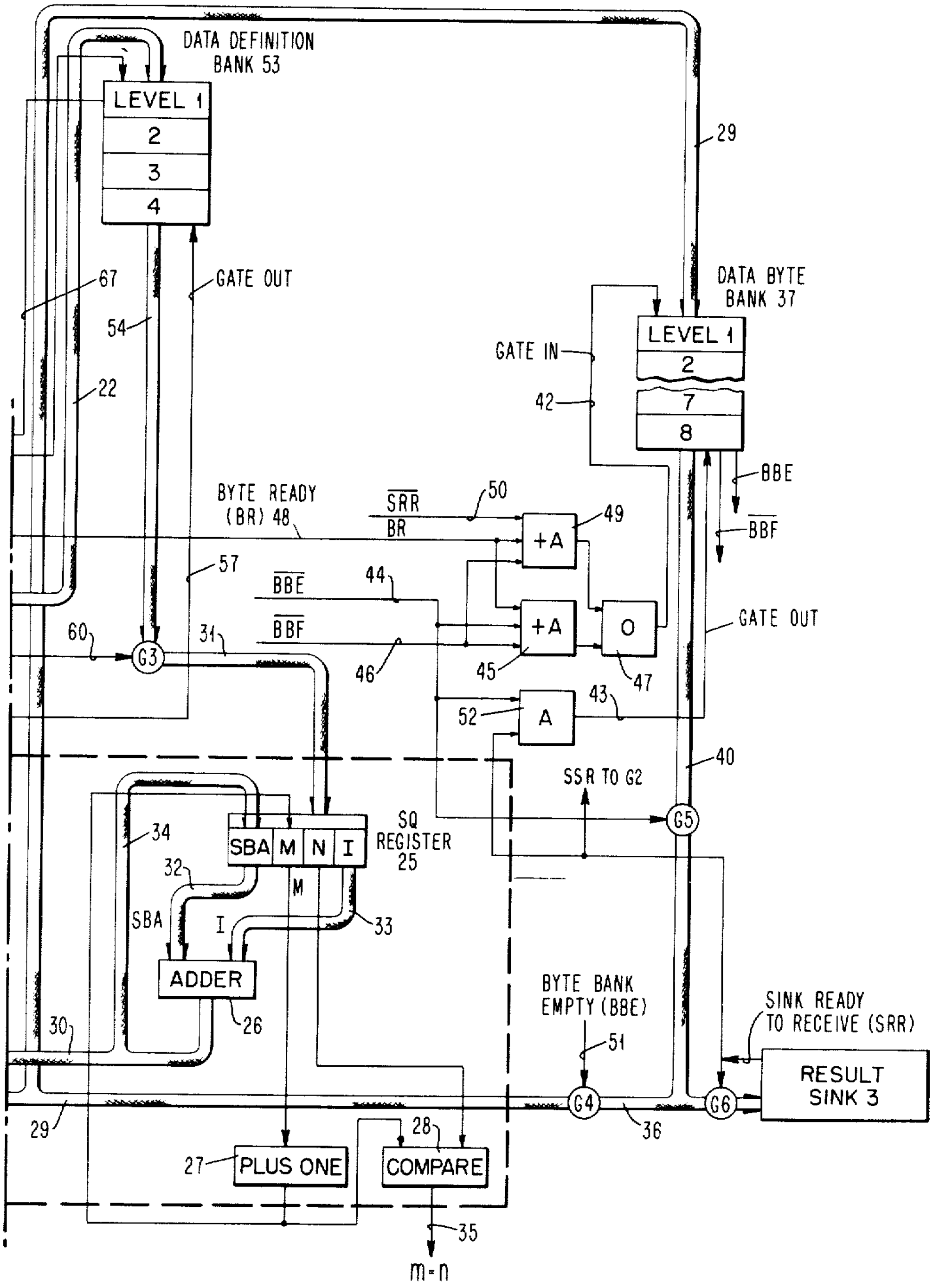

Referring now to FIGURES 2*a* and 2*b*, there is shown a detailed logic diagram of apparatus embodying the invention. The operand source 1 comprises three storage-devices: a one-cycle storage device 7, a three-cycle storage device 8, and an eight-cycle storage device 9. Included as a part of each one of the storage devices is an address register which selects locations in the associated storage device in the manner of the operand selector 4 previously described with reference to FIGURE 1. When an address is supplied to the one-cycle storage 7, on cable 12, the contents of the storage at the specified address emerge on cable 10 one cycle later. The presence of an output from the one-cycle storage 7 is indicated on line 11. When an address is supplied on cable 13, to the three-cycle storage 8, the data stored at the addressed location emerges on cable 14 four cycles later. The occurrence of data on cable 14 is indicated by a signal on line 15. When an address is supplied on cable 16 to the eight-cycle storage 9, data at the addressed location emerges on cable 17 eight cycles later. The occurrence of data on cable 17 is indicated by a signal on line 18.

Figure 3A:
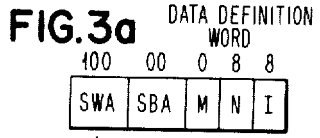

The path selection control 19 permits addresses to be supplied to one of the storage devices 7, 8 or 9 only, during any related group of operations of the apparatus shown in FIGURES 2*a* and 2*b*. The particular one of the devices selected is determined by a signal on the line labeled Path Selector 20. A data definition word, the format of one of which is shown in detail in FIGURE 3*a*, is received from the data definition source 5, shown in FIGURE 1, by the path selection control 19 on the data definition word cable 21. The SWA word address portion of the data definition word is sent to one of the storage devices 7, 8 or 9 on one of the cables 12, 13 or 16 selected by the path selector line 20. The remaining portions SBA, M, N and I of the data definition word are emitted by the path selection control 19 on cable 22. The data definition word available on cable 21 is passed through the path selection control 19 only when a signal appears on input line Transmit (T) 23.

The operand processor and processing control 2 is shown, for the purposes of illustration only, as comprising a stream indexing unit of the type disclosed in co-pending U.S. patent application "Computer Indexing Apparatus," Herwitz et al., Serial No. 65,560, filed October 26, 1960 and assigned to the International Business Machines Corporation, the disclosure of which is incorporated herein by this reference. The operand processor and processing control 2 as shown comprises a byte selection matrix 24, and SQ register 25, an adder 26, a plus one incrementer 27 and a comparator 28.

The byte selection matrix may be constructed in the manner disclosed in co-pending U.S. patent applications: Serial No. 630,133, filed December 14, 1956, now Pat. No. 3,054,091, entitled "Data Transferring Systems," A. E. Brennemann; Serial No. 651,654, filed April 9, 1957, entitled "Data Transfer System," H. K. Wild et al.; Serial No. 786,947, filed January 15, 1959, now Pat. No. 3,109,162, entitled "Data Boundary Cross-Over and/or Advance Data Access System," W. Wolensky; Serial No. 802,693, filed March 30, 1959, entitled "Two Level Matrix," J. C. Logue; and Serial No. 66,251, filed October 31, 1960, now Pat. No. 3,119,098, entitled "Stream Editing Unit," R. M. Meade; all assigned to IBM. These applications are, by this reference, incorporated herein.

64-bit data words received from one of the cables 10, 14 and 17 by the byte selection matrix 24 emerge as streams of selected eight-bit bytes on output cable 29. The presence of a byte on cable 29 is indicated by a signal on the line labeled Byte Ready (BR) 48. Eight-bit data bytes are selected by byte addresses (SBA) supplied to the byte selection matrix 24 on cable 30. Thus, referring to FIGURES 3*a* and 3*b*, the SBA portion for this example (initially 00) of the data definition word is repeatedly updated (by 8) to address the first bit (0, 8, 16, etc.) of each of the bytes A through H of the data word, in turn. If a data word having the format shown in FIGURE 3*b* appears at the 64-bit data word input of the byte selection matrix 24, a stream of bytes A, B, C, etc., will emerge on the cable 29.

The SQ register 25 receives data definition words one at a time, from the path selection control 19, on cable 31 as will be described below. The SBA and I portions of the data definition word stored in the SQ register 25 are transferred each cycle to an adder 26 via cables 32 and 33. The resultant sum replaces the previous SBA portion in the SQ register 25 via cable 34. The sum is also sent to the byte selection matrix 24 via cable 30, to select the next byte. In this way successive portions of the 64-bit data word entered into the byte selection matrix 24 are addressed, starting with the bit indicated by the initial SBA portion and progressing through successive bytes defined by the sum of the current SBA portion and the I portion. It takes one cycle for the current SBA portion to be stored in the SQ register 25, to be supplied to the byte selection matrix 24 via cable 30, for the selected byte to emerge on cable 29 and to be made available. The N portion of the data definition word stored in the SQ register 25 determines the number of increments taken. For example, if the number eight is stored in the N portion, then eight incrementing cycles will be taken. The M portion of the data definition word in the SQ register 25 records the current number of incrementing cycles that have been taken. During each incrementing cycle this M portion is increased by one in the plus 1 incrementer 27. The increased amount is compared with the specified number in the N portion in the comparator 28. The M portion of the SQ register 25 is updated, after comparison with the N portion, at the same time as the SBA portion is updated. When the current number of incrementing cycles taken equals the number specified in the N portion of the SQ register 25, there will be an output on line 35 from comparator 28. This indicates that the specified number of incrementing cycles have been taken and terminates operation of the operand processor and processing control 2. The SBA and M portions are not updated in this cycle, generally being replaced by a new data definition word.

Selected bytes are transferred from the byte selection matrix 24 to the data byte result sink 3 via cables 29 and 36 if gates G4 and G6 are operated. The result sink 3 can receive bytes from the byte selection matrix 24, or another source (the data byte bank 37) to be described below, when it indicates that it is ready by means of a signal on line labeled Sink Ready to Receive (SRR). If the result sink 3 is not ready to receive data, there will be no signal on the Sink Ready to Receive (SRR) line (a condition indicated in FIGURES 2*a* and 2*b* as $\overline{\text{SRR}}$), and gate G6 will not be operated. The data emerging from the byte selection matrix 24 will not be lost, however, due to the operation of the data byte bank 37.

The data byte bank 37 comprises a number of register levels operating in a standard manner as a first-in first-out reservoir. Data entering into level one first will emerge from level 8 first. Data that enters subsequently will emerge subsequently in the order of entry. This may be performed in a variety of manners, of which one is shown utilizing what may be defined as a plurality (one for each bit) of eight-position (one position for each level) shift registers. Each new byte is entered into the first position of all eight shift registers in parallel, filling level one, when the gate-in line 42 is operated. A signal on the gate-out line 43 causes the controls of the data byte bank 37 to shift downward until the one byte in the bottom-most filled level is shifting out of the bank 37 into the cable 40. For example, if there were bytes in level one and level two, a single gate-out signal on line 43 will shift level two onto cable 40. A signal will appear on OR circuit 47 output line 42 via AND circuit 49, assuming of course that the data byte bank 37 is not full (signal on $\overline{\text{BBF}}$ line 46), if the result sink 3 is not ready to receive a byte (signal $\overline{\text{SRR}}$ line 50) and that a byte is ready (signal on BR line 48) in the byte selection matrix 24. There will be a signal on line 42 via OR circuit 47 due to AND circuit 45 also.

If the data byte bank 33 contains any information in any level $\overline{\text{BBF}}$), there will be a signal on line 44 to AND circuit 45. If the byte bank 37 is not completely full ($\overline{\text{BBF}}$), that is one or more of the eight levels are empty, then there will be a signal on input line 46 to the AND circuit 45. As a result, AND circuit 45 will operate to place a signal on line 42 via OR circuit 47 whenever the data byte bank 37 contains bytes in one or more but not all of its levels if, of course, a byte is available from the byte selection matrix as indicated by a signal on the Byte Ready (BR) line 48. It may be seen that data bytes are placed into the data byte bank 37 in two cases: (1) If the byte selection matrix has a byte available (BR) and the byte bank already contains a data byte ($\overline{\text{BBE}}$) which should be handled first by the result sink 3, and (2) If a byte is ready (BR) in the byte selection matrix 24 but the result sink 3 is not ready ($\overline{\text{SRR}}$) to receive it. Naturally, the data byte bank 37 cannot receive data bytes if it is full. This situation is anticipated, the spacing of data words allowing for continued storage in the 64-bit data word register of the byte selection matrix 24.

If the data byte bank is empty (BBE), the data bytes from the byte selection matrix 24 will be channeled to the result sink 3 if it is ready (SRR), via cable 36, due to the operation of gate G4 by BBE line 51, and operation of gate G6 by the Sink Ready to Receive SRR output of the result sink 3. If the data byte bank contains any information then gate G4 will not be operated, blocking the transfer of information from the byte selection matrix directly to the result sink 3. Instead a byte is sent from the byte bank 37 to the result sink 3 through gate G5 which is operated by a signal on line 43 from AND circuit 52. This occurs only if the $\overline{\text{BBE}}$ line 44 indicates that the data byte bank 37 contains one or more data bytes and the Sink Ready to Receive line SRR indicates that the result sink 3 is ready. The particular data byte transferred is selected on the first-in first-out basis previously described.

In summary, data bytes emerging from the byte selection matrix 24 are eventually sent to the result sink 3 in the order that they emerged, whether or not the result sink 3 was ready to receive them at the time they emerged. If the result sink 3 is ready to receive data bytes when they are available from the byte selection matrix 24 (and if no bytes are waiting in the data byte bank 37) bytes are sent directly via cables 29 and 36 to the result sink 3. However, if the result sink 3 is not ready to receive data bytes when they are available from the byte selection matrix 24, they are sent temporarily into the data byte bank 37. When the result sink 3 is ready to receive data byes it first empties out the data byte bank 37 in the order in which it was filled.

Only when the data byte bank 37 is empty does the result sink 3 again receive data bytes directly from the byte selection matrix 24. In this manner, the original sequence of result bytes is preserved.

The data definition bank 53 is a first-in first-out reservoir, similar to the data byte bank 37, for holding the parameter portions of data definition words until the data word addressed by the associated SWA portion can be accessed. When a data definition word is received on cable 21 to the path selection control 19, the SWA portion is sent to one of the storage devices 7, 8, or 9. The parameters SBA, M, N, and I are sent to the data definition bank 53, which holds them for later recovery in the order in which they were received. Thus, if additional data definition words received on cable 21 were utilized, the SWA portion may be sent to the proper storage device and the parameter portions of the data definition word may be stored in the data definition bank 53 without danger of losing the association of corresponding SWA and parameter (SBA, M, N, I) portions. For example, if the eight-cycle storage 9 is selected four successive data definition words may be received on the data definition word cable 21 before any related data words arrive on read-out cable 17. The associated parameters (the SBA, M, N, and I portions of the data definition word) are stored in order in the data definition bank 53. As the selected data words emerge from the operand source 1, the proper associated parameters are removed from the data definition bank 53 on a first-in first-out basis, for use in processing the data word.

The construction of the data definition bank 53 is similar to the data byte bank 37 described above. Parameters enter level one on cable 22 in one order and leave level four on cable 54 in the same order. A signal on Transmit (T) line 23 places parameters on cable 54 from the bottom-most level holding a parameter. The in-gate line 23 permits the entry of parameters from the cable 22 to the first level. During subsequent cycles the first level parameters are shifted to level 2, level 3 and level 4 in order. As new parameters are entered into level one, a signal on out-gate line 57 steps the data definition bank 53 bottom-most filled level contents out onto cable 54. The order of gating out of the data definition bank 53 is the same as the order of gating in.

The parameters stored in the data definition bank 53 are used in the operand processor and processing control 2 upon related data words received from the operand source 1. Each time that gate G3 is operated by a signal on line 60, a group of parameters is entered into the SQ register 25. This occurs due to the recognition of a data word emerging from one of the storage units 7, 8 or 9, in the operand source 1, which cause signals on one of the lines 11, 15 or 18 (applied to the OR circut 61), to operate the gate G3, and (via the OR circuit 62) signal the out gate line 57. Gate G3 is operated at the same time that a 64-bit data word leaves a storage device 7, 8 or 9. Since the data words will emerge from the operand source 1 in the same order as they emerge from the data definition bank 53, each word will always be associated with its corresponding parameters.

Data definition words will be sent to the data definition bank 53 and the operand source 1 only when a signal occurs on the Transmit (T) line 23. The occurrence of this signal is conditioned upon the simultaneous occurrence of two signals to AND circuit 65; one on the line Data Definition Word Available (DDWA) 63 indicating that a data definition word is available and a second on line 64. Assuming that a data definition word is available, as evidenced by a DDWA signal on line 63, a signal on line 64 is the determining factor in the selection of a new data definition word. A signal will appear on this line 64 whenever the N portion of the last received data definition word (in level one) specifies a number which equals the number of times that the result sink 3 has been ready to receive data bytes since the data definition word was sent to the data definition bank 53. This timing properly spaces data definition words and data words to most efficiently utilize the apparatus. There is, of course, no restriction on the availability of a new data definition word. The word may be available either before or after a signal appears on line 64. The timing is accomplished by transferring the N portion of the parameters of the last data definition word sent to the data definition bank 53 (found in level one) to an N register 66, via a line 67 and a gate G1. The gate G1 is, in turn, operated by a signal on the Transmit 3 line 23 at the time that this last data definition word is sent to the data definition bank 53 and to the operand source 1. Each time that the result sink 3 is ready to receive a data byte, an SRR signal will appear at the input 68 of gate G2, causing the N register contents 66 to be decremented by one through the minus one circuitry 69. An N decoder 70 monitors the current contents of the N Register 66 at all times. One cycle after the N register contains the number one, the input 64 of the AND circuit 65 will have a signal applied to it. The one cycle delay is obtained by means of a delay circuit 71. If a data definition word is available, as indicated by a DDWA signal on line 63, a Transmit (T) output occurs from AND circuit 65 and another data definition word will be sent to the data definition bank 53 and to the operand source 1. The N portion of this data definition word will be immediately entered into the N register 66, as previously described, by the application of a T signal to gate G1.

DETAILED OPERATION

Figure 3B:
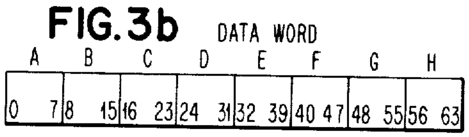

The operation of the apparatus shown in FIGURES 2*a* and 2*b* will now be described with reference to the pulse diagram of FIGURE 3*c* and the illustrative word formats shown in FIGURES 3*a* and 3*b*. Referring first to FIGURES 3*a* and 3*b*, there are shown the formats of an illustrative data definition word and a data word. The data definition word shown in FIGURE 3*a* is assumed to be waiting on cable 21 causing a DDWA signal on line 63. It specifies an SWA address (100) in the three cycle storage 8. The indicated increment (I) is 8, the number of increments to be taken (N) are 8. In FIGURE 3*b*, there is shown the data word found at locations $SWA=100$ which comprises 64 bits, starting with bit 0. The data definition word addresses the first bit of 8-bit segments (bytes in the data word) at 8-bit intervals ($I=8$) for eight cycles (since $N=8$) starting at bit 0 (since $SBA=00$). The eight-bit bytes are indicated by letters A through H. The data word shown in FIGURE 3*b* is stored in the three-cycle storage 8 at the beginning of the operation to be described.

Figure 3C:
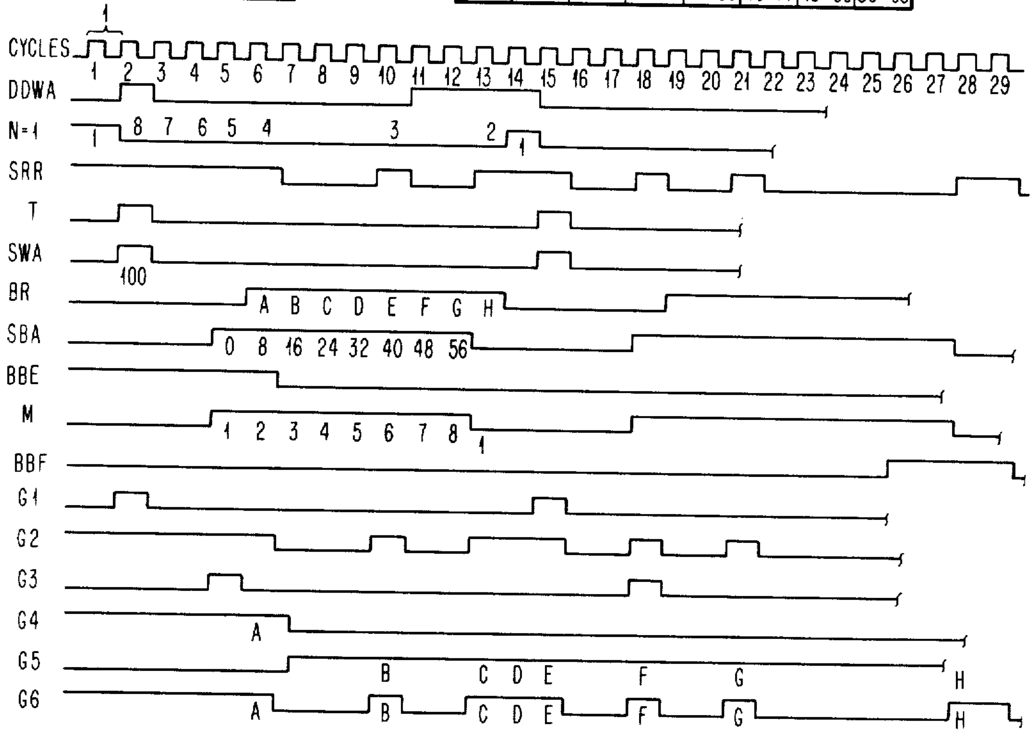

Referring now to FIGURE 3*c*, there are shown the signals present in the indicated portions of the circuit of FIGURES 2*a* and 2*b*. Cycles of operation are numbered to indicate points of reference during the operation of the invention. A signal DDWA (Data Definition Word Available) indicates that a data definition word is available on cable 21. A signal $N=1$ indicates that the N register 66 contains the number 1. The other contents of the N register are indicated in the diagram of FIGURE 3*c* for information purposes only. A signal SRR (Sink Ready to Receive) indicates that the result sink 3 is ready to receive a data byte. A signal (Transmit) indicates that a new data definition word is to be transmitted to the data definition bank 53 and to the operand source 1. A signal SWA indicates that the SWA portion of a data definition word has been sent to the operand source 1 via one of the cables 12, 13, or 16. A signal BR (Byte Ready) indicates that the byte selection matrix 24 has a byte ready to be sent to either the result sink 3 or to the data byte bank 37. A signal SBA indicates the byte specified by the SBA portion of the data definition word currently stored in the SQ register 25. A signal BBE (Byte Bank Empty) indicates that the data byte bank 37 is empty. Signals M indicate the current contents of the M portion of the data definition word stored in the SQ register 25. Signals BBF (Byte Bank Full) indicate that the data byte bank 37 is full. Signals G1 through G6 are indicated to show when transfers may occur through gates G1 through G6.

During the first cycle of operation the N register 66 contains a one as indicated by a signal on the line $N=1$ due to the counting down of the number obtained from the N portion of the previous data definition word. The result sink 3 is ready to receive data bytes as indicated by a signal on the line SRR which holds gates G6 and G2 in an operating condition. The data byte bank is empty, as indicated by a signal on the line BBE which holds gate G4 in an operating condition.

During the second cycle of operation a new data definition word (the one shown in FIGURE 3*a*) becomes available on cable 21. This is indicated by a signal on the DDWA line 63. As a result there are signals at both inputs 63 and 64 of the AND circuit 65 resulting in an output on Transmit (T) line 23. The input 64 is the result of the $N=1$ output of the N Decoder 70 delayed one cycle by the delay line 71. Occurrence of a signal on the Transmit (T) line 23 causes the data definition word on the cable 21 to be transferred through the path selection control 19. The SWA portion (100) is sent to the three-cycle storage 8 via the cable 13. The parameters ($SBA=00$, $M-0$, $N-8$ and $I-8$) is sent via the cable 22 to the data definition bank 53, where they are entered into level one due to a signal on the Transmit (T) line 23. The Transmit (T) line 23 also causes operation of gate G1, which enters the N portion (8) of the data definition word just stored in level one of the data definition bank 53 into the N register 66.

During the third cycle of operation the Sink Ready to Receive SRR line from the result sink 3 has a signal on it as before, causing the operation of gate G2 via line 68, which causes the contents (8) of the N register 66 to be decremented by one (to 7). The gate G4 between the byte selection matrix 24 and the result sink 3 remains in operation during this cycle, but no data byte is available from the data byte selection matrix 24 at this time (the data word not having arrived) and so no byte can be transferred to the result sink 3.

During the fourth cycle of operation the Sink Ready to Receive SRR line from the result sink 3 is still operative, causing the contents (7) of the N register 66 to be decremented (to 6) by operation of the gate G2. Again, no byte is transferred from the byte selection matrix 24 to the result sink 3.

Before the fifth cycle of operation a 64-bit data word has left the three cycle storage device 8 via the cable 10 and has entered the byte selection matrix 24. The line 11 carries a signal indicating the availability of the data word.

During the fifth cycle of operation the signal on the line 11 causes operation of the gate G3 via the OR circuit 61 and the line 60, bringing the data definition word previously placed in level one, into the SQ register 25 via the cables 54 and 31 from the data definition bank 53. The data definition word entered into the SQ register 25 is selected by the out-gate line 57 via OR circuit 62 and line 11. The first eight-bit byte (A) of the data word is immediately selected, by the SBA portion (00) of the data definition word placed in the SQ register 25 which is applied to the byte selection matrix 24 via the cable 32, the adder 26 and the cable 30. The SBA portion is not incremented during this cycle, the M portion (0) is initially incremented to 1. This selected 8-bit byte will not be available at the output 29 of the byte selection matrix 24 until the next cycle. Since there is a signal on the SRR line to gate G2, the N-register contents (6) are decremented (to 5).

During the sixth cycle of operation the previously selected byte (A) appears at the output of the byte selection matrix 24 and is transferred via the cable 29 to the data byte sink 34, gate G4 being operated because the data byte bank 37 is empty (BBE), and gate G6 being operated because the sink is ready to receive (SRR) a data byte. Gate G2 is operated, as previously described, causing the contents (5) of the N-register 66 to be decremented by one (to 4). The contents (00) of the SBA portion of the data definition word in the SQ register 25 are sent to the adder 26 at the same time as the contents (8) of the increment portion. The sum (08) of these two portions is sent to the byte selection matrix 24 from the adder 26 via the cable 30. The selected data byte (B) will not be available from the byte selection matrix 24 until the next cycle. The sum (08) is also used to update the SBA portion of the SQ register 25. The M portion (1) of the data definition word in the SQ register 25 is incremented by one (to 2) in the plus 1 circuitry 27.

During the seventh cycle of operation the previously selected data byte (B) is available at the output 29 of the byte selection matrix 24. However, the result sink 3 is no longer ready to receive ($\overline{SRR}$) data bytes. As a result, gate G6 is not operated. Referring to the AND circuit 49, the sink is not ready to receive ($\overline{SRR}$) causing a signal on input 50, a byte is already in the byte selection matrix (BR) causing a signal on input 48, and the data byte bank 37 is not full ($\overline{BBF}$) causing a signal on input 46. As a result, AND circuit 49 has an output which is applied via OR circuit 47 to the in-gate line 42. The data byte (B), available from the byte selection matrix 24 is thus sent to the level 1 of the data byte bank 37. The SBA portion (08) of the data definition word in the SQ register 25 is added to the increment portion (08) in the adder 26 to form a new SBA portion (16), which is sent to the byte selection matrix 24 to select a new data byte (C) and is used to update (to 16) the SBA portion of the SQ register 25. The M portion (2) of the data definition word in the SQ register 25 is updated by one (to 3) in the plus 1 incrementer 27. Since the data byte bank 37 is no longer empty ($\overline{BBE}$), gate G5 becomes operative and the gate G4 becomes inoperative. The next data byte accepted by the result sink 3 (by operation of the gate G6) will select a data byte from the data byte bank 37 instead of from the data selection matrix 24. The contents (4) of the N register 66 are not changed since gate G2 is not operated when the sink is not ready ($\overline{SRR}$).

During the eighth cycle of operation the next data byte (C) is available at the output 29 of the byte selection matrix 24. As previously described gate G4 is inoperative and the result sink 3 is not ready to receive $\overline{SRR}$ the data bytes, so that this data byte (C) is sent to the data byte bank 37 level one. The previous data byte (B) is transferred to the data byte bank 37 level 2. This operation is performed by a signal on gate-in line 42 and AND circuit 49 which occurs when the sink is not ready ($\overline{SRR}$), a byte is ready (BR) and the byte bank is not full ($\overline{BBF}$). The SBA portion (16) of the data definition word in the SQ register 25 is updated (to 24) in the adder 26 by the increment portion (08), and the new SBA portion (24) is sent to the byte selection matrix 24 to select the next data byte (D). The M portion (3) is updated by one (to 4). The gate G5 remains operative, but since the result sink 3 is not ready to receive a data byte no transfer occurs through it. The lack of an SRR signal holds gate G2 inoperative preventing change of the contents (4) of the N register 66.

During the ninth cycle of operation the next data byte (D) is available at the output 29 of the byte selection matrix 24. Since the result sink 3 is not ready to receive the data byte ($\overline{SRR}$) at this time, this data byte (D) is transferred to level one of the data byte bank 37, the previous data byte (C), being shifted to level 2 and the preceding data byte (B) being shifted to level 3. The current SBA portion (24) is incremented in the adder 26 and the new SBA portion (32) is sent via cable 30 to the byte selection matrix 24 to cause the selection of the next data byte (E) for use during the next cycle of operation. The M portion (4) is incremented by one (to 5) in the plus 1 circuit 27. The gate G5 remains operative but does not transfer any data byte to the result sink 3, because the latter is not ready to receive data bytes. The gate G2 remains inoperative preventing change in the N register 66 contents (4).

During the tenth cycle of operation the result sink 3 is ready to receive a data byte (SRR). The signal on the Sink Ready to Receive SRR line causes operation of gate G6. A signal also appears on the gate-out line 43 via the AND circuit 52, which is operative to place a signal on output line 43 whenever there is a signal on the Sink Ready to Receive SRR line and a signal on line 44 indicates that the data byte bank 38 is not empty $(\overline{BBE})$. Since gate G5 is operative $(\overline{BBE})$ the first data byte (B) entered into the data byte bank 37 is transferred from level 3 to the result sink 3. Operation of the Sink Ready to Receive SRR output of the data byte bank 37 also causes operation of gate G2, causing the contents (4) of the N register 66 to be decremented by one (to 3) in the Minus One circuitry 69. The contents of the SBA portion (32) of the SQ register 25 are incremented in the adder 26 and the new SBA portion (40) is sent to the byte selection matrix 24 to cause selection of the next data byte (F). The M portion (5) is incremented by one (to 6). During this cycle of operation another data definition word is available on cable 21, as indicated by a signal (DDWA) on the input 63.

During the eleventh cycle of operation the result sink 3 is no longer ready to receive bytes $(\overline{SRR})$. The data byte (F) available at the output 29 of the byte selection matrix 24 is stored in level one of the data byte circuit 27 and, as previously described, all previous data bytes are shifted down one level. A new SBA portion (48) is generated by the adder 26 to select a new data byte portion (G) in the byte selection matrix 24. The M portion (6) is incremented one (to 7). The data definition word previously available on cable 21 is still available at this time. Since the result sink 3 is not ready $(\overline{SRR})$, gate G2 will be inoperative preventing change of the N register 66 contents (3).

During the twelfth cycle of operation the result sink 3 is not ready to receive bytes $(\overline{SRR})$. The data byte (G) available at the output 29 of the byte selection matrix 24 is sent to level 1 of the data byte bank 37, as previously described, all previous data bytes in the bank being shifted down one level. A new SBA portion (56) is generated in the adder 26 which selects a new data byte (H) in the byte selection matrix 24. The M portion (7) is incremented by one (to 8), and compared with the N portion (8) in the comparator 28. This comparison has been made during each previous M incrementing cycle. For the first time the comparison is successful. The resulting signal $M=N$ on the line 35 signals the operand processor and processing control 2 to cease operations upon the data word received from the three cycle storage device 8. Thus, no additional data bytes after the currently requested byte (H) will be available at the output 29 of the byte selection matrix 24 until a new data definition word is available. However, the result sink 3 has so far received only a small portion of the data bytes selected by the data byte matrix 24. The data definition word is still available to the cable 21. The N register 66 contents (3) are unchanged.

During the thirteenth cycle of operation the result sink is again able to accept data bytes (SRR), as indicated by a signal on the Sink Ready to Receive SRR line. As a result, the data byte (C) in the lowest filled level (fifth) of the data byte bank 37 is transferred from the data byte bank 37 through gates G5 and G6 to the result sink 3 as previously described. The signal on the Sink Ready to Receive SRR line further causes operation of gate G2, decrementing the current contents (3) of the N register by one (to 2). The currently available data byte (H) at the output 29 of the byte selection matrix 24 is entered into the data byte bank 37 level one, as previously described, all previously received data bytes in the data byte bank 37 being shifted down one level. The gate G4 remains inoperative as long as the Data Byte Bank 37 contains one or more data bytes $(\overline{BBE})$. The gate G5 remains operative under the same conditions. The M portion (8) is reset (to 0).

During the fourteenth cycle of operation, the result sink 3 is again ready to receive data bytes (SRR). Operation of gate G6 and output line 43 of AND circuit 52 causes the data byte (D) in the lowest filled level (fifth) of the data byte bank 37 to be transferred to the result sink 3. The Sink Ready to Receive SRR line also causes gate G2 to be operated, decrementing the current contents (2) of the N register 66 by one (to 1). As a result, the N Decoder 70 generates a signal at output $N=1$, which will be available on line 64 during the next cycle (due to the one cycle delay circuit 71).

During the fifteenth cycle of operation there is a signal on input 64 of AND circuit 65 due to recognition by the N decoder 70 that the contents of the N register 66 equals one. There is also an input 63 at the AND circuit 65 as a result of the availability of a data definition word on cable 21. As a result, there is an output signal on line 23 from AND circuit 65, causing Transmit (T) signals to be applied to the path selection control 19, the gate-in line to the data definition bank 53 and the gate G1. Another data definition word is thus entered into level one of the data definition bank 53 via the path selection control 19 and cable 22. The SWA portion of this data definition word is sent to the three-cycle storage device 8 via the cable 12. The N portion of the data definition word stored in level one of the data definition bank 53 is sent via line 67 and gate G1 to the N register 66.

Continuing in the fifteenth cycle of operation, the result sink 3 is operative to receive data bytes (SRR), causing the removal of the data byte (E) in the lowest filled level (fourth) of the data byte bank 37 to the result sink 3, via the gates G5 and G6. The SQ register 25 does not receive the new data definition word until the 64-bit data word defined by the SWA portion of that word emerges from the three-cycle storage 8.

During the sixteenth and during the seventeenth cycles of operation, the result sink 3 is not ready to receive data bytes $(\overline{SRR})$ and the new data word has not yet emerged from the three-cycle storage 8. As a result no changes occur in the system.

During the eighteenth cycle of operation the sink is ready to receive (SRR), causing the gate G6 to transfer the lowest filled level (third) byte (F) from the data byte bank 37 to the result sink 3. The signal on the Sink Ready to Receive SRR line causes the contents of the N Register 66 to be decremented via the gate G2. During this cycle of operation the new 64-bit data word emerges from the three-cycle storage device 8 via the cable 10, signaling the gate G3 via the line 60, the OR circuit 61 and the line 11. The gate-out line 57 is operating via OR circuit 62. The new data definition word is transferred from the data definition bank 53 through the gate G3 to the SQ register 25. The new SBA portion is sent to the byte selection matrix 24 to select a new data byte.

During the nineteenth and twentieth cycles of operation the data byte sink 3 is not ready to receive any more data bytes (SRR). As a result no data bytes are removed from the data byte bank 37 during these two cycles of operation and the contents of the N register 66 remain the same. However, during these two cycles of operation two new data bytes are selected in the path selection matrix 24. The new SBA portion in the SQ register 25 and the new N portion are updated.

During the twenty-first cycle of operation the result sink 3 is again ready to receive data bytes (SRR). Operation of gate G6 and the AND circuit 52 causes the lowest filled level data byte (G) to be sent to the result sink 3. The contents of the N register 66 are decremented by one, and an additional data byte is selected in the byte selection matrix 24. The SBA and M portions of the SQ register 25 are updated.

During the twenty-second through twenty-seventh cycles of operation the result sink 3 is not ready to receive additional data bytes ($\overline{SRR}$). Therefore, the contents of the data byte bank 37 remain the same and the contents of the N register 66 are not decremented. However, five new data bytes are selected from the byte selection matrix 24 during each cycle and the SBA portion and M portion of the SQ register 25 are updated during each cycle. For illustration, it is shown in FIGURE 3*c* that byte bank 37 is full (BBF) starting at the twenty-sixth cycle, no data byte can be entered in the twenty-seventh cycle.

During the twenty-eighth cycle of operation the result sink 3 is again ready to receive a data byte (SRR). A signal on the Sink Ready to Receive SRR line causes operation of gate G6 and AND circuit 52. The last data byte (H) of the original 64-bit data word is removed from the data byte bank 37. The N register 66 is decremented by one, a new data byte is selected in the byte selection matrix 24 and the SBA and M portions of the SQ register 25 are updated. The byte bank 37 is still full (BBF) preventing entry of a byte.

Thus, during the twenty-eighth cycle of operation the last data byte (H) selected from the first 64-bit data word has been transferred to the data result sink 3. During the removal of data bytes from the data byte bank 37, the operand processor and processing control 2 have been active. New data bytes have been stored in the data byte bank 37, except during the cycles when the byte bank 37 is full, which bytes will be removed for entry into the result sink 3 whenever the result sink 3 is ready to receive them. For example, during the twenty-ninth cycle of operation the sink is ready to receive data bytes. Since the data byte bank is not empty ($\overline{BBE}$), gate G4 will be inoperative and gate G5 will be operative. Therefore, the first data byte from the second 64-bit data word (stored in the data byte bank 37) will be sent to the result sink 3.

There has been described apparatus for timing requests for operands in a manner which permits variable operand processing and utilization times. This apparatus compensates for the fact that operands may be supplied to a processor at a rate which is faster than the rate that the processor can handle new operands. Further, the apparatus compensates for the fact that processed operands can be utilized by an external utilization device at only unpredictable times. Thus, by timing new operands to arrive at intervals which are a function of the number of operations performed and the number of processed operands accepted by the external utilization device it is possible to maintain an even flow of operands from the source to the utilization device.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for processing in steps data representative operands, in accordance with definitions, including: a source of operands; selection means, connected to said operand source, for selecting operands; definition means operable to supply a sequence of data definitions, each definition including a first part specifying operands to be selected for processing and a related second part specifying processing parameters, one of said parameters indicating the number of operations required to process the operand specified by the first part; transfer means, connecting said definition means and said selection means, operable to transfer first parts of data definitions from said definition means to said selection means; operand processing means, connected to said operand source and to said definition means, for receiving from said operand source operands specified by first parts of data definitions selected by said selection means, processing said received operands in a number of operations indicated by said related second parts of said supplied data definition and generating results for each processing step; result means connected to said operand processor for receiving results and for indicating readiness to receive results; register means connected to said definition means for receiving one of said second parts at a time; decrementing means connected to said register means and to said result means operable by each readiness indication to decrement said one parameter of said registered second part by one; detection means connected to said register means for generating a signal when said one parameter of said registered second part is decremented to a predetermined number; and data transfer control means connected to said definition means and to said detection means operable by said predetermined number signal to cause said definition means to supply another data definition to said selection means and to said operand processor.

2. In combination: a memory having addressable locations for storing operands comprising a plurality of bits; supply means connected to said memory repeatedly operable to supply sequential parameter signal groups, each indicating the location of an operand to be removed from said memory and a number of processing operations to be performed thereon; an operand processor connected to said memory and to said supply means for removing from said memory, processing and utilizing a first operand in accordance with a first parameter signal group from said supply means; detecting means connected to said operand processor and to said supply means for detecting and signaling when a second number of operations indicated in accordance with a second parameter signal group from said supply means have been performed upon said first operand and utilized by said operand processor; and means connected to said detecting means and to said supply means operable by a signal from said detecting means to make said supply means operable to supply another signal group.

3. Apparatus for controlling requests for feeding of unprocessed units from a source to a sink, via a utilization processor which performs a specified number of operations upon each unprocessed unit including: registering means for registering a value representing the number of operations to be performed upon a related currently requested unprocessed unit; indicating means for indicating whenever a processed unit is accepted by the sink; means connected to said indicating means and to said registering means for changing the value in said registering means for each processed unit accepted by the sink; and means connected to said registering means operable, whenever the value in the registering means reaches a predetermined value, to request a new unprocessed unit.

4. In a data processing system wherein current requests for data to be processed are honored after a time delay, wherein current data from previous requests is operated upon a number of times during processing and wherein processed data is utilized externally at random times; apparatus for achieving an optimum rate of requests including: requesting means operable to currently request data for subsequent processing; first means for indicating a current value representing the number of times that currently requested data is to be operated upon; second means operable to indicate when currently processed previously requested data may be externally utilized; and means connecting said requesting means with said first and second means for making said requesting means operable to request new data whenever the second means has been operated a number of times equal to the current value indicated by said first means.

5. In cyclically operable apparatus; storing means, having selectable locations, for storing operands; selecting means connecting to said storing processing means for selecting operands; means connected to said storing means for processing selected operands for a group of cycles and generating results during each of said cycles; receiving means connected to said processing means operable to receive results during random ones of said cycles; means connected to said selecting and receiving means operable to cause selection of an additional operand when said receiving means has received a specified number of results.

6. The combination recited in claim 5 further including: means connected between said processing means and said receiving means for temporarily absorbing results generated by said processing means during cycles when said receiving means is not operable to receive results.

7. The combination recited in claim 5 further including: indicating means connected to said processing means for indicating the number of cycles required to process selected operands; and means connected between said indicating means and said processing means for temporarily absorbing said indications.

8. Apparatus for controlling the rate at which a unit source feeds units through a unit processor to a utilization sink including: supply means for supplying a series of requests, including a current request, for new units and for supplying a series of definitions, including a current definition, specifying a number of related operations to be performed upon the requested unit when the request is honored; first means, connecting the supply means to the unit source, operable to send the current request for a new unit to the unit source; second means, connecting the supply means to the unit processor, operable to send the current definition to the unit processor for subsequent use when the request is honored; and third means, connected to the supply means, the sink and to the first means, for making said first means operable to request a new unit once every time that the number of units fed to the sink equals the number of operations, to be performed upon the currently requested unit, specified by the current definition.

9. In combination: supplying means operable to supply units to be operated upon; operating means connected to said supplying means for operating upon said units a defined number of times; receiving means connected to said operating means for receiving said operated-upon units at random times; indicating means connected to said receiving means for indicating the readiness of said receiving means to receive operated-upon units; definition means sequentially defining units to be supplied and the number of operations to be subsequently performed upon said units; specification means connected to said indicating means and to said definition means operable to specify whenever the number of operations to be performed upon a currently defined unit equals the number of times that said receiving means currently indicates readiness to receive operated-upon units; and means connected to said supplying means and said specification means for making said supplying means operable to supply units in accordance with the operation of said specification means.

10. The combination set forth in claim 9 further including: first means connected between said definition means and said operating means for correlating the operations performed upon the unit supplied by said supplying means and said number of operations to be performed; and second means interposed between said operating means and said receiving means for delaying operated-upon units until said receiving means indicates readiness to receive them.

11. In combination: a definition source operable to supply a current definition to a series of previously supplied definitions, each defining an operand and a number of operations to be performed upon the defined operand; an operand source connected to said definition source for supplying a series of operands each operand being defined, in turn, by a different definition; an operand processor connected to said operand source and to said definition source for receiving said series of operands in the order supplied by said operand source and said series of definitions in the order supplied by said definition source and performing upon each operand in the series, in the order received, the number of operations specified by each definition in the series, in the order received; a result sink connected to the operand processor for accepting processed operands at times indicated by the result sink; and means connected to the result sink and to the definition source for making said definition source operative to supply another definition to the series whenever the number of processed operands accepted by the result sink bears a predetermined relationship to the number of operations specified by said current definition.

12. The combination recited in claim 11, further comprising: reservoir means, connected to said operand processor, operable to absorb processed operands available at times when said result sink is not ready to receive them; signal means connected to said reservoir means for emitting a signal when said reservoir contains one or more processed operands; and means, connected to said signal means and connecting said result sink to said reservoir means and to said operand processor, selectively operable, at times when said result sink is ready to receive processed operands, in a first mode to transfer processed operands from said operand processor to said result sink if said signal does not occur, and in a second mode to transfer processed operands from said reservoir means to said result sink if said signal does occur.

References Cited by the Examiner

UNITED STATES PATENTS 3,059,221 10/1962 Page ............ 340—172.5

ROBERT C. BAILEY, *Primary Examiner.*

MALCOLM A. MORRISON, *Examiner.*